(12) United States Patent
Shang et al.

(10) Patent No.: US 8,861,444 B2
(45) Date of Patent: Oct. 14, 2014

(54) METHOD AND SYSTEM FOR INTERACTIVELY SELECTING AUXILIARY CELL

(75) Inventors: Hua Shang, Shenzhen (CN); Xianzhou Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 159 days.

(21) Appl. No.: 13/812,611

(22) PCT Filed: Apr. 18, 2011

(86) PCT No.: PCT/CN2011/072921
§ 371 (c)(1),
(2), (4) Date: Jan. 28, 2013

(87) PCT Pub. No.: WO2012/022159
PCT Pub. Date: Feb. 23, 2012

(65) Prior Publication Data
US 2013/0128763 A1 May 23, 2013

(30) Foreign Application Priority Data
Aug. 20, 2010 (CN) .......................... 2010 1 0265074

(51) Int. Cl.
*H04Q 7/00* (2006.01)
*H04W 48/18* (2009.01)
*H04W 48/16* (2009.01)
*H04W 24/02* (2009.01)

(52) U.S. Cl.
CPC .............. *H04W 48/18* (2013.01); *H04W 48/16* (2013.01); *H04W 24/02* (2013.01)
USPC ............................ 370/328; 370/329; 370/336

(58) Field of Classification Search
None
See application file for complete search history.

(56) References Cited

U.S. PATENT DOCUMENTS

| 8,427,978 B2* | 4/2013 | Xiao .............................. 370/254 |
| 2011/0044272 A1* | 2/2011 | Cui et al. ....................... 370/329 |
| 2011/0183669 A1* | 7/2011 | Kazmi ............................. 455/434 |

FOREIGN PATENT DOCUMENTS

| CN | 101583161 A | 11/2009 |
| CN | 101998420 A | 3/2011 |

(Continued)

OTHER PUBLICATIONS

International Search Report in international application No. PCT/CN2011/072921, mailed on Jul. 28, 2011.

(Continued)

*Primary Examiner* — Duc C Ho
(74) *Attorney, Agent, or Firm* — Oppedahl Patent Law Firm LLC

(57) ABSTRACT

The disclosure provides a method for interactively selecting an auxiliary cell, which includes: a UE selects a master cell and performs data interaction with the master cell to obtain a neighbor cell list; the UE measures coordinated multiple point status information of a cell in the neighbor cell list, and perform evaluation according to a measurement result to generate a candidate list of coordinated multiple point auxiliary cells; when the UE initiates a coordinated multiple point operation service, the UE sends the candidate list to the master cell; the master cell performs an activation strategy on a cell in the candidate list to obtain an auxiliary cell for the coordinated multiple point operation of the UE, and sends an auxiliary cell activation list to the UE; and the UE maintains the auxiliary cell activation list until the coordinated multiple point operation service ends. The disclosure further provides a system for interactively selecting an auxiliary cell. By means of the method and apparatus above, a preferable neighbor cell can be selected as an auxiliary cell through interaction, and service quality and user experience in a coordinated multiple point operation is improved.

16 Claims, 4 Drawing Sheets

(56) References Cited

FOREIGN PATENT DOCUMENTS

| JP | 2012507888 A | 3/2012 |
|----|--------------|--------|
| WO | 2010060185 A1 | 6/2010 |
| WO | 2010082884 A1 | 7/2010 |

OTHER PUBLICATIONS

English Translation of the Written Opinion of the International Search Authority in international application No. PCT/CN2011/072921, mailed on Jul. 28, 2011.

Sharp, Further Considerations on MBSFN Precoding for DL CoMP, 3GPP TSG RAN WG1 Meeting #56, R1-091133, Mar. 23-27, 2009.

* cited by examiner

METHOD AND SYSTEM FOR INTERACTIVELY SELECTING AUXILIARY CELL

TECHNICAL FIELD

The disclosure relates to selection of an auxiliary cell in a coordinated multiple point transmission and reception technology, and in particular to a method and a system for interactively selecting an auxiliary cell.

BACKGROUND

A coordinated multiple point transmission and reception technology is proposed for further satisfying requirements of a Long Term Evolution (LTE) system on edge users' throughout, edge users' frequency utilization ratio and the whole performance of a system, and is appointed by the 3rd Generation Partnership Project (3GPP) as an importance element in the technology framework of an LTE-advanced system to serve as a successor of an LTE system. The core idea of the technology is to serve one or more users at the same time by multiple transmission points which are neighbours in is space.

FIG. 1 shows a schematic diagram of the coordinated multiple point transmission and reception technology in a cellular network, as shown in FIG. 1, base station A controls three cells: base station A-cell 1, base station A-cell 2 and base station A-cell 3 respectively; and base station B control two cells: base station B-cell 1 and base station B-cell 2 respectively; wherein UE 1 is served by the base station A-cell 1, the base station A-cell 2 and the base station A-cell 3 which are adjacent to the UE 1, and UE 2 is served by the base station B-cell 1 and the base station B-cell 2 which are adjacent to the UE 2.

Compared with an existing LTE network framework and design idea, the largest change brought by the coordinated multiple point transmission and reception technology is that User Equipment (UE) performs data reception and sending operations with multiple spatial neighbouring cells at the same time, in this case, how to coordinate cooperative work among multiple cells which are separated in position and operates independently is very important, for which a concept of centralized management needs to be introduced, that is, a master cell and an auxiliary cell exist. The master cell is responsible to selection, status collection, analysis, scheduling allocation or the like of all cooperated cells, and to data interaction with a user, therefore it has relatively complex functions; while the auxiliary cell is mainly responsible for completing its own status interaction with the master cell, performing data interaction with a user or the like, from which it can be seen that the auxiliary cell has relatively simple functions. Moreover, the roles of the master cell and the auxiliary cell can be exchanged under a certain condition; for different UEs, the same cell may play different roles at the same time, for example, as shown in FIG. 1, the base station A-cell 3 can be the master cell of the UE 1, and meanwhile the auxiliary cell of the UE 2.

When a service adopting the coordinated multiple point transmission and reception technology is triggered, a UE may generally select a current resident cell as a master cell, but in a cellular network, a master cell has multiple neighbour cells, therefore, how to select a suitable neighbour cell as an auxiliary to participate in a coordinated multiple point operation is a problem that urgently needs to be solved currently.

SUMMARY

In view of the problem above, the main purpose of the disclosure is to provide a method and a system for interactively selecting an auxiliary cell, thus solving the problem about how to select a suitable neighbour cell as an auxiliary cell in a coordinated multiple point operation.

In order to achieve the purpose above, the technical solution of the disclosure is realized as follows.

A method for interactively selecting an auxiliary cell is provided, which includes:

a UE selects a master cell, and performs data interaction with the master cell to obtain a neighbour cell list;

the UE measures coordinated multiple point status information of a cell in the neighbour cell list, and performs evaluation according to a measurement result to generate a candidate list of coordinated multiple point auxiliary cells;

when the UE initiates a coordinated multiple point operation service, the UE sends the candidate list to the master cell;

the master cell performs an activation strategy on a cell in the candidate list to obtain an auxiliary cell for the coordinated multiple point operation of the UE, and sends an auxiliary cell activation list to the UE; and the UE maintains the auxiliary cell activation list until the coordinated multiple point operation service ends.

Wherein, before the UE maintains the auxiliary cell activation list, the method may further include:

the UE sends a suggestion report to the master cell when finding, by real-time measurement and evaluation, that a cell in the candidate list reaches a condition of becoming an auxiliary cell in the activation list or that a cell in the activation list does not satisfy a condition of severing as an auxiliary cell any longer; the master cell determines, through decision-making, whether to add or delete an auxiliary cell, and sends a determination result to the UE; and finally, the UE maintains the auxiliary cell activation list according to the determination result.

Wherein, before the UE selects the master cell, the method may further include:

neighbour cells send coordinated multiple point status information to each other;

after the coordinated multiple point status information is received by a cell, coordinated multiple point status information of a neighbour cell maintained by the cell is updated, and a neighbour cell supporting the coordinated multiple point operation is determined; and each cell periodically measures its own coordinated multiple point status information and sends it to a neighbour cell supporting the coordinated multiple point operation, and the neighbour cell updates a neighbour cell list stored by the neighbour cell itself after periodically receiving the coordinated multiple point status information measured.

Wherein, the coordinated multiple point status information may include: a coordinated multiple point operation attribute of a cell and a performance parameter of the cell related to a coordinated multiple point operation.

Wherein, the performing evaluation according to a measurement result to generate a candidate list of coordinated multiple point auxiliary cells may include: a performance value of a coordinated multiple point operation is calculated by using a selection algorithm according to a performance parameter related to the coordinated multiple point operation, and an auxiliary cell candidate list is generated according to the performance value, wherein a cell having a larger performance value has higher priority in the auxiliary cell candidate list.

Wherein, the activation strategy may include: a selection algorithm is used to determine a cell, a performance value of which reaches a threshold, as an auxiliary cell by taking a performance parameter of a cell in the candidate list related to the coordinated multiple point operation as an index.

A system for interactively selecting an auxiliary cell is provided, which includes: a UE and a master cell, wherein the UE is configured to: select the master cell and perform data interaction with the master cell to obtain a neighbour cell list; measure coordinated multiple point status information of a cell in the neighbour cell list, and performs evaluation according to a measurement result to generate a candidate list of coordinated multiple point auxiliary cells; send the candidate list to the master cell; and maintain an activation list until a coordinated multiple point operation service ends; and the master cell is configured to: perform an activation strategy on a cell in the candidate list to obtain an auxiliary cell for the coordinated multiple point operation of the UE, and send an auxiliary cell activation list to the UE.

Wherein, the UE may be further configured to: send a suggestion report to the master cell when finding, by real-time measurement and evaluation, that a cell in the candidate list reaches a condition of becoming an auxiliary cell in the activation list or that a cell in the activation list does not satisfy a condition of severing as an auxiliary cell any longer; and the master cell may be further configured to: determine, through decision-making, whether to add or delete an auxiliary cell, and send a determination result to the UE.

Wherein, the UE may be further include one or more neighbour cells, wherein the neighbour cell may be configured to: send the coordinated multiple point status information with the master cell and other neighbour cells to each other; and periodically measure its own coordinated multiple point status information and send it to the master cell; and the master cell may be further configured to: after receiving the coordinated multiple point status information of the neighbour cell, update coordinated multiple point status information of the neighbour cell maintained by the master cell, and determine a neighbour cell supporting the coordinated multiple point operation; and periodically measure its own coordinated multiple point status information and send it to the neighbour cell supporting the coordinated multiple point operation, and update a neighbour cell list stored by the master cell after periodically receiving the coordinated multiple point status information measured by the neighbour cell.

In the method and the system for interactively selecting an auxiliary cell, a UE selects a master cell and performs data interaction with the master cell to obtain a neighbour cell list; the UE measures coordinated multiple point status information of a cell in the neighbour cell list, and performs evaluation according to a measurement result to generate a candidate list of coordinated multiple point auxiliary cells; when the UE initiates a coordinated multiple point operation service, the UE sends the candidate list to the master cell; the master cell performs an activation strategy on a cell in the candidate list to obtain an auxiliary cell for the coordinated multiple point operation of the UE, and sends an auxiliary cell activation list to the UE; and the UE maintains the auxiliary cell activation list until the coordinated multiple point operation service ends. A preferable neighbour cell is selected as an auxiliary cell by interaction between the UE and the master cell, which is helpful to improvement of service quality and edge is throughput of an auxiliary cell and use efficiency of frequencies in a coordinated multiple point operation, and further improves user experience.

DETAILED DESCRIPTION

The basic concept of the disclosure is that: a UE selects a master cell and performs data interaction with the master cell to obtain a neighbour cell list; the UE measures coordinated multiple point status information of a cell in the neighbour cell list, and performs evaluation according to a measurement result to generate a candidate list of coordinated multiple point auxiliary cells; when the UE initiates a coordinated multiple point operation service, the UE sends the candidate list to the master cell; the master cell performs an activation strategy on a cell in the candidate list to obtain an auxiliary cell for the coordinated multiple point operation of the UE, and sends an auxiliary cell activation list to the UE; and the UE maintains the auxiliary cell activation list until the coordinated multiple point operation service ends.

The technical solution of the disclosure will be further described in detail in combination with the accompanying drawings and specific embodiments hereinafter.

Figure 1:
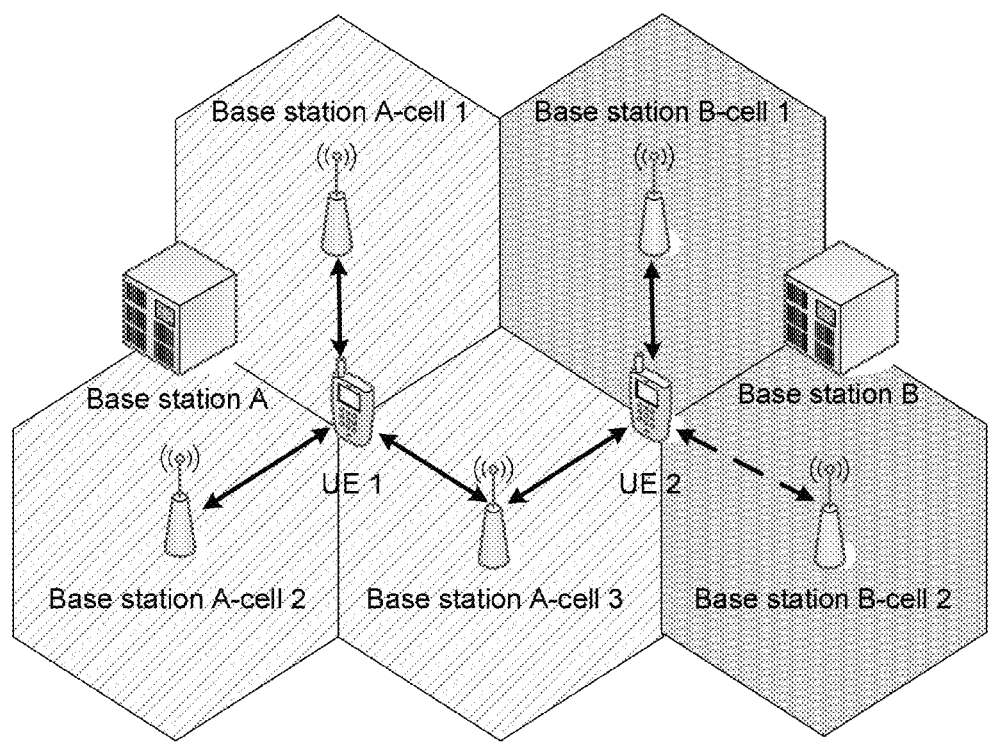
FIG. 1 shows a schematic diagram of the coordinated multiple point transmission and reception technology in a cellular network.
Figure 2:
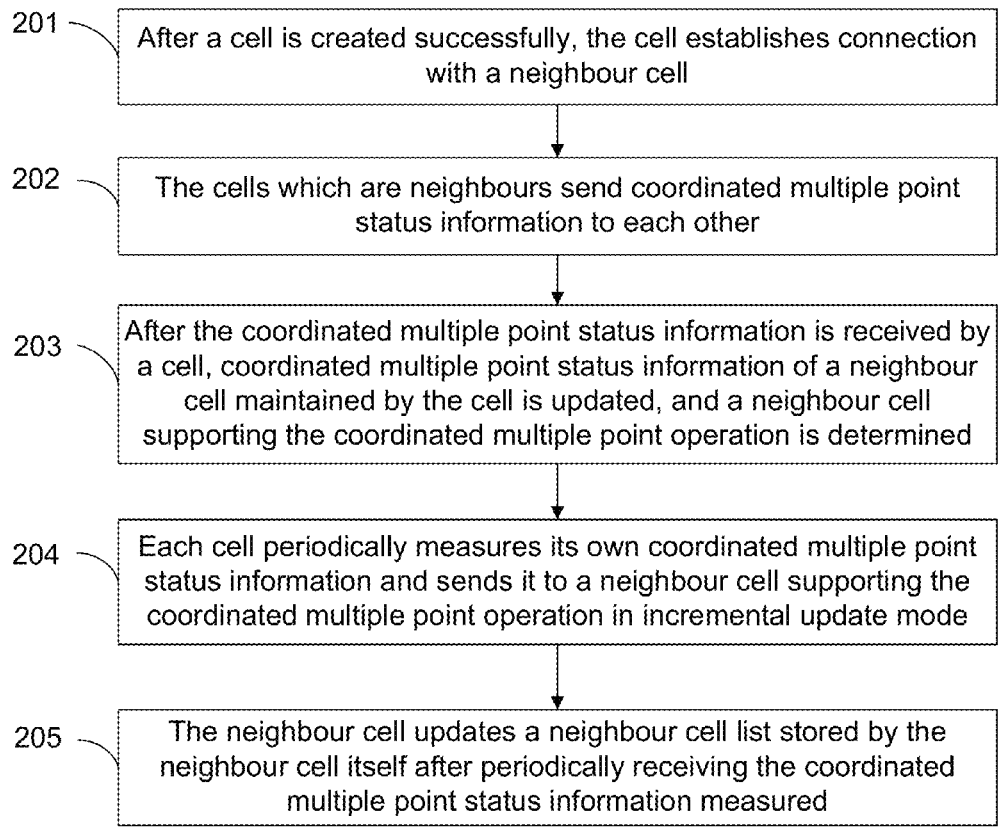
FIG. 2 shows a flow diagram of a method for updating neighbour cell status information of each cell before interactively selecting an auxiliary cell according to the disclosure.

FIG. 2 shows a flow diagram of a method for updating status information of a neighbour cell of each cell before interactively selecting an auxiliary cell according to the disclosure, as shown in FIG. 2, the method for updating status information of a neighbour cell specifically includes the following steps.

Step 201: after a cell is created successfully, the cell establishes connection with a neighbour cell.

Specifically, after a cell is created successfully, the cell establishes connection with one or more neighbour cells through an X2 interface according to a neighbour cell list stored by the cell.

Step 202: the cells which are neighbours send coordinated multiple point status information to each other.

Specifically, besides a coordinated multiple point operation attribute of a cell, the coordinated multiple point status information further includes: performance parameters of the cell related to a coordinated multiple point operation, such as channel quality information of the cell, the degree of interference from the neighbour cell of the cell, the level of interference produced by a UE in the cell or the like; wherein, the coordinated multiple point operation attribute includes: the cell supports a coordinated multiple point operation, or the cell does not support a coordinated multiple point operation.

Step 203: coordinated multiple point status information of the neighbour cell maintained by the cell is updated after the coordinated multiple point status information is received, and a neighbour cell supporting the coordinated multiple point operation is determined.

Specifically, updating coordinated multiple point status information of the neighbour cell maintained by the cell is completed by updating coordinated multiple point status information stored by the neighbour cell list of the cell. Since the coordinated multiple point status information contains the coordinated multiple point operation attribute, the cell receiving the coordinated multiple point status information can find a neighbour cell which can support the coordinated multiple point operation.

Step 204: each cell periodically measures its own coordinated multiple point status information and sends it to a neighbour cell supporting the coordinated multiple point operation in incremental update mode.

Specifically, the period of the measurement may be set according to the speed of change of a cell, and the measurement is generally performed by taking hour as a period. The coordinated multiple point status information specifically includes: a coordinated multiple point operation attribute of the cell and performance parameters of the cell related to a coordinated multiple point operation. The incremental update mode specifically refers to that: only changed coordinated multiple point status information is sent to a neighbour cell after the neighbour cell list is initially configured.

Step 205: the neighbour cell updates its neighbour cell list which stores coordinated multiple point status information of its neighbour cell after periodically receiving the coordinated multiple point status information measured.

Specifically, the coordinated multiple point status information of the neighbour cell is stored in the neighbour cell list.

Further, in the flow of the method shown in FIG. 2, both a cell and its neighbour cell are relative, and each cell can take itself as the cell and perform the flow with its neighbour cell.

Figure 3:
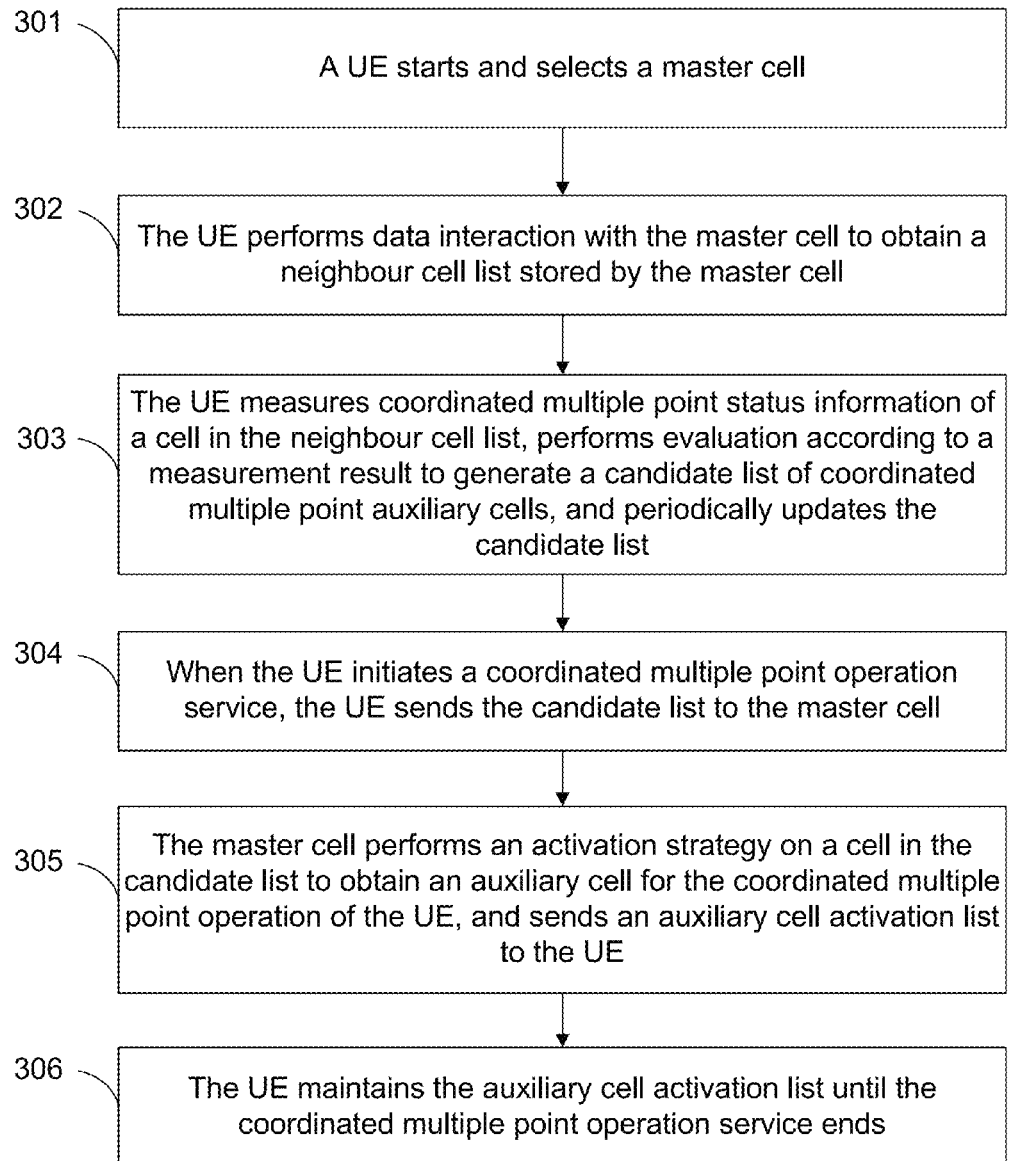
FIG. 3 shows a flow diagram of a method for interactively selecting an auxiliary cell according to the disclosure.

FIG. 3 shows a flow diagram of a method for interactively selecting an auxiliary cell according to the disclosure, as shown in FIG. 3, the method for interactively selecting an auxiliary cell specifically includes the following steps.

Step 301: a UE starts and selects a master cell.

Specifically, after starting, the UE may select a resident cell, wherein the resident cell defaults to a master cell in a coordinated multiple point operation.

Step 302: the UE performs data interaction with the master cell to obtain a neighbour cell list stored by the master cell.

Specifically, the UE performs data interaction with the master cell to obtain a neighbour cell list stored by the master cell, so as to obtain coordinated multiple point status information of a neighbour cell.

Step 303: the UE measures coordinated multiple point status information of a cell in the neighbour cell list, performs evaluation according to a measurement result to generate a candidate list of coordinated multiple point auxiliary cells, and periodically updates the candidate list.

Specifically, the UE performs measurement on a cell in the neighbour cell list by using remaining ability of the UE itself, wherein the remaining ability means remaining available system resources except those system resources used by the UE to make necessary calls, perform data interaction and other operation. The object of the measurement is coordinated multiple point status information of a cell in the neighbour cell list and specifically includes a coordinated multiple point operation attribute of the cell and performance parameters of the cell related to a coordinated multiple point operation, wherein the performance parameters include, for example, channel quality is information of the cell, the degree of interference from other neighbour cells of the cell, the level of interference produced by the UE in the cell or the like. The evaluation refers to the evaluation completed according to the performance parameters of the cell in the neighbour cell list related to a coordinated multiple point operation which are obtained by the measurement, and a preferable mode may be: calculating a performance value of a coordinated multiple point operation by using a selection algorithm according to each performance parameter, and generating an auxiliary cell candidate list according to the performance value, wherein a cell having a larger performance value has higher priority in the auxiliary cell candidate list, for example, when calculating a performance value, the better the channel quality of a cell is, the higher the performance value is; the lower the degree of interference from signals of other neighbour cells is, the higher the performance value is; and the lower the level of interference produced by a UE in a cell is, the higher the performance value is.

The periodic update of the auxiliary cell candidate list is completed by periodical measurement and evaluation, and when it is found, by measurement and evaluation, that a cell which does not exist in the auxiliary cell candidate list reaches a condition of becoming a candidate auxiliary cell, or that a cell which exists in the auxiliary cell candidate list does not satisfy a condition of severing as a candidate auxiliary cell any longer, the auxiliary cell candidate list is updated. The periodic update generally adopts an update period of minute level.

Step 304: when the UE initiates a coordinated multiple point operation service, the UE sends the candidate list to the master cell.

Step 305: the master cell performs an activation strategy on cells in the candidate list to obtain an auxiliary cell for the coordinated multiple point operation of the UE, and sends an auxiliary cell activation list to the UE.

Specifically, the activation strategy is: using a selection algorithm to determine a cell whose performance value reaches a threshold as an auxiliary cell by taking a performance parameter of a cell in the candidate list related to the coordinated multiple point operation as an index, and making cells meeting the standard of the auxiliary cell into an auxiliary cell activation list and sending the auxiliary cell activation list to the UE. Wherein, the threshold may be determined in advance by simulation testing and debugging.

Step 306: the UE maintains the auxiliary cell activation list until the coordinated multiple point operation service ends.

Specifically, the maintaining operation is: receiving updated information sent by the master cell in incremental update mode and updating the auxiliary cell activation list.

Further, before Step 306, the method further includes: the UE sends a suggestion report to the master cell when finding, by real-time measurement and evaluation, that a cell in the candidate list reaches a condition of becoming an auxiliary cell in the activation list or that a cell in the activation list does not satisfy a condition of severing as an auxiliary cell any longer; the master cell determines, through decision-making, whether to add or delete an auxiliary cell, and sends a determination result to the UE; and the UE maintains the auxiliary cell activation list according the determination result. Wherein, the standard for the master cell to make a decision may be the same as that of the activation strategy in Step 305. Besides the coordinated multiple point status information, the object of real-time measurement and evaluation performed by the UE further includes service error ratio, Quality of Service (QoS) parameter or the like.

Figure 4:
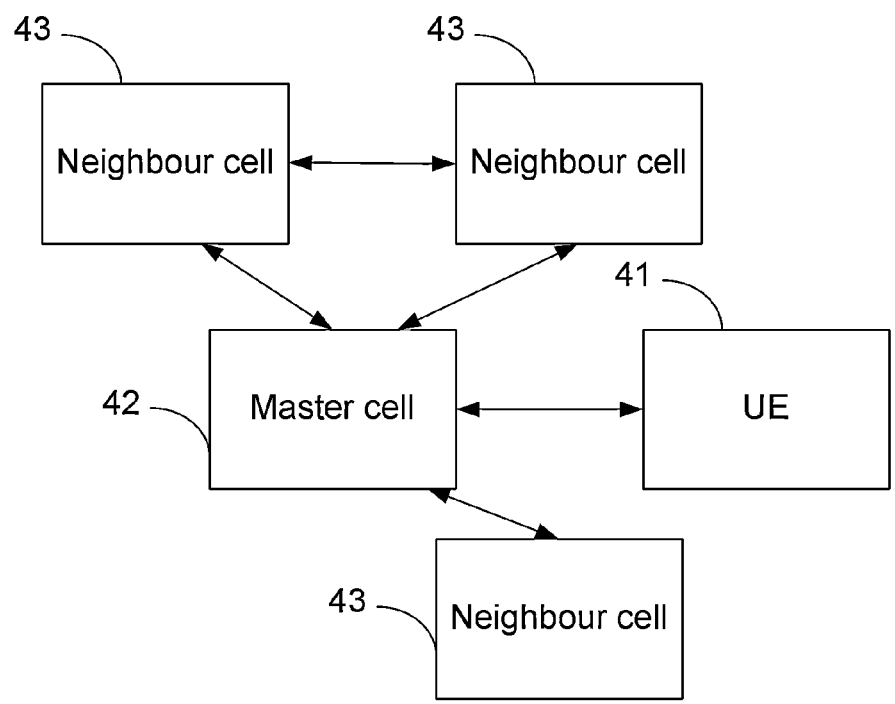
FIG. 4 shows a structural diagram of a system for interactively selecting an auxiliary cell according to the disclosure.

FIG. 4 shows a structural diagram of a system for interactively selecting an auxiliary cell according to the disclosure, as shown in FIG. 4, the system includes: a UE 41 and a master cell 42, wherein the UE 41 is configured to: select the master cell 42 and perform data interaction with the master cell 42 to obtain a neighbour cell list; measure coordinated multiple point status information of a cell in the neighbour cell list, and perform evaluation according to a measurement result to generate a candidate list of coordinated multiple point auxiliary cells; periodically update the candidate list and send the candidate list to the master cell 42; and maintain an activation list until a coordinated multiple point operation service ends;

Specifically, after the UE starts, the UE 41 may select a resident cell, wherein the resident cell defaults to the master cell 42 in a coordinated multiple point operation. The UE 41 performs data interaction with the master cell 42 to obtain a neighbour cell list stored by the master cell 42, so as to obtain coordinated multiple point status information of neighbour cells.

The UE 41 performs measurement on a cell in the neighbour cell list by using remaining ability of the UE itself, wherein the remaining ability means remaining available system resources except those system resources used by the UE 41 for is performing operations, such as necessary call, data interaction or the like. The object of the measurement is coordinated multiple point status information of a cell in the neighbour cell list and specifically includes a coordinated multiple point operation attribute of the cell and performance parameters of the cell related to a coordinated multiple point operation, wherein the performance parameters include, for example, channel quality information of the cell, the degree of interference from other neighbour cells of the cell, the level of interference produced by a UE in the cell or the like. The evaluation refers to the evaluation completed according to the performance parameters of the cell in the neighbour cell list related to a coordinated multiple point operation which are obtained by measurement, and a preferable mode may be: calculating a performance value of a coordinated multiple point operation by using a selection algorithm according to each performance parameter, and generating an auxiliary cell candidate list according to the performance value, wherein a cell having a larger performance value has higher priority in the auxiliary cell candidate list.

The periodic update of the auxiliary cell candidate list is completed by periodical measurement and evaluation, and when it is found, by measurement and evaluation, that a cell which does not exist in the auxiliary cell candidate list reaches a condition of becoming a candidate auxiliary cell, or that a cell which exists in the auxiliary cell candidate list does not satisfy a condition of severing as a candidate auxiliary cell any longer, the auxiliary cell candidate list is updated. The periodic update generally adopts an update period of minute level.

When the UE 41 initiates a coordinated multiple point operation service, the UE 41 sends the candidate list to the master cell 42. The maintaining operation is receiving updated information sent by the master cell 42 in incremental update mode and updating the auxiliary cell activation list.

The master cell 42 is configured to: perform an activation strategy on a cell in the candidate list to obtain an auxiliary cell for the coordinated multiple point operation of the UE 41, and send an auxiliary cell activation list to the UE 41.

Specifically, the activation strategy is: using a selection algorithm to determine a cell whose performance value reaches a threshold as an auxiliary cell by taking a performance parameter of a cell in the candidate list related to the coordinated multiple point operation as an index, and making cells meeting the standard of the auxiliary cell into an auxiliary cell activation list to send it to the UE 41. Wherein, the threshold may is be determined in advance by simulation testing and debugging.

Further, the UE 41 is further configured to: send a suggestion report to the master cell 42 when finding, by real-time measurement and evaluation, that a cell in the candidate list reaches a condition of becoming an auxiliary cell in the activation list or that a cell in the activation list does not satisfy a condition of severing as an auxiliary cell any longer; and the master cell 42 is further configured to: determine, through decision-making, whether to add or delete an auxiliary cell, and send a determination result to the UE 41.

Specifically, the standard of the decision-making may be the same as that of activation strategy.

Further, the system further includes: one or more neighbour cells 43, wherein the neighbour cell 43 is configured to: send coordinated multiple point status information with the master cell 42 and other neighbour cells 43 to each other; and periodically measure its own coordinated multiple point status information and send it to the master cell 42 in incremental update mode.

Specifically, after the master cell 42 or the neighbour cell 43 is created successfully, the master cell 42 or the neighbour cell 43 establishes connection through an X2 interface according to a neighbour cell list stored by themselves. The coordinated multiple point status information includes the coordinated multiple point operation attribute of the cell itself, and further includes: performance parameters of the cell related to a coordinated multiple point operation, such as channel quality information of the cell, the degree of interference from neighbour cells of the cell, the level of interference produced by a UE in the cell or the like. Wherein, the coordinated multiple point operation attribute includes: the cell supports a coordinated multiple point operation or the cell does not support a coordinated multiple point operation.

The period of the measurement may be set according to the speed of change of a cell, and the measurement is generally performed by taking hour as a period. The coordinated multiple point status information specifically includes: a coordinated multiple point operation attribute of the neighbour cell 43, and performance parameters of the neighbour cell 43 related to a coordinated multiple point operation. The incremental update mode specifically refers to that: only changed coordinated multiple point status information is sent to the master cell 42 after a neighbour cell list is initially is configured.

The master cell 42 is further configured to: after receiving the coordinated multiple point status information of the neighbour cell 43, update the coordinated multiple point status information of the neighbour cell maintained by the master cell 42, and determine the neighbour cell 43 supporting a coordinated multiple point operation; and periodically measure its own coordinated multiple point status information and send it to the neighbour cell 43 supporting the coordinated multiple point operation, and update a neighbour cell list stored by the master cell after periodically receiving the coordinated multiple point status information measured by the neighbour cell 43.

Specifically, updating coordinated multiple point status information maintained by a cell is completed by updating coordinated multiple point status information stored by a neighbour cell list of the cell. Since the coordinated multiple point status information contains the coordinated multiple point operation attribute, a cell receiving the coordinated multiple point status information can find a neighbour cell which can support the coordinated multiple point operation.

The period of the measurement may be set according to the speed of change of a cell, and the measurement is generally performed by taking hour as a period. The coordinated multiple point status information specifically includes: a coordinated multiple point operation attribute of the master cell 42, and performance parameters of the master cell 42 related to a coordinated multiple point operation. The incremental update mode specifically refers to that: only changed coordinated multiple point status information is sent to neighbour cells 43 after a neighbour cell list is initially configured.

The above are only preferable embodiments of the present disclosure, and are not used to limit to the scope of protection of the present disclosure. Any modifications, equivalent substitutes, improvements or the like made within the concept and principle of the present disclosure shall fall within the scope of protection of the present disclosure.

The invention claimed is:

1. A method for interactively selecting an auxiliary cell, comprising:
   selecting, by a UE, a master cell, and performing data interaction with the master cell to obtain a neighbour cell list;
   measuring, by the UE, coordinated multiple point status information of a cell in the neighbour cell list, and performing evaluation according to a measurement result to generate a candidate list of coordinated multiple point auxiliary cells;
   sending, by the UE, the candidate list to the master cell when the UE initiates a coordinated multiple point operation service;
   performing, by the master cell, an activation strategy on a cell in the candidate list to obtain an auxiliary cell for the coordinated multiple point operation of the UE, and sending an auxiliary cell activation list to the UE; and
   maintaining, by the UE, the auxiliary cell activation list until the coordinated multiple point operation service ends.

2. The method according to claim 1, further comprising: before the maintaining the auxiliary cell activation list by the UE,
   sending, by the UE, a suggestion report to the master cell when finding, by real-time measurement and evaluation, that a cell in the candidate list reaches a condition of becoming an auxiliary cell in the activation list or that a cell in the activation list does not satisfy a condition of severing as an auxiliary cell any longer; determining, by the master cell, through decision-making, whether to add or delete an auxiliary cell, and sending a determination result to the UE; and finally, maintaining, by the UE, the auxiliary cell activation list according to the determination result.

3. The method according to claim 2, further comprising: before the selecting a master cell by the UE,
   sending coordinated multiple point status information to each other by neighbour cells;
   updating, by a cell, coordinated multiple point status information of its neighbour cell maintained by the cell after the cell receives the coordinated multiple point status information, and determining a neighbour cell supporting a coordinated multiple point operation; and
   periodically measuring, by each cell, its own coordinated multiple point status information and sending it to a neighbour cell supporting the coordinated multiple point operation, and updating, by the neighbour cell, a neighbour cell list stored by the neighbour cell itself after periodically receiving the coordinated multiple point status information measured.

4. The method according to claim 2, wherein the coordinated multiple point status information comprises: a coordinated multiple point operation attribute of a cell and a performance parameter of the cell related to a coordinated multiple point operation.

5. The method according to claim 2, wherein the performing evaluation according to a measurement result to generate a candidate list of coordinated multiple point auxiliary cells comprises: calculating a performance value of a coordinated multiple point operation by using a selection algorithm according to a performance parameter related to the coordinated multiple point operation, and generating an auxiliary cell candidate list according to the performance value, wherein a cell having a larger performance value has higher priority in the auxiliary cell candidate list.

6. The method according to claim 2, wherein the activation strategy comprises: using a selection algorithm to determine a cell, a performance value of which reaches a threshold, as an auxiliary cell by taking a performance parameter of a cell in the candidate list related to the coordinated multiple point operation as an index.

7. The method according to claim 1, further comprising: before the selecting a master cell by the UE,
   sending coordinated multiple point status information to each other by neighbour cells;
   updating, by a cell, coordinated multiple point status information of its neighbour cell maintained by the cell after the cell receives the coordinated multiple point status information, and determining a neighbour cell supporting a coordinated multiple point operation; and
   periodically measuring, by each cell, its own coordinated multiple point status information and sending it to a neighbour cell supporting the coordinated multiple point operation, and updating, by the neighbour cell, a neighbour cell list stored by the neighbour cell itself after periodically receiving the coordinated multiple point status information measured.

8. The method according to claim 1, wherein the coordinated multiple point status information comprises: a coordinated multiple point operation attribute of a cell and a performance parameter of the cell related to a coordinated multiple point operation.

9. The method according to claim 1, wherein the performing evaluation according to a measurement result to generate a candidate list of coordinated multiple point auxiliary cells comprises: calculating a performance value of a coordinated multiple point operation by using a selection algorithm according to a performance parameter related to the coordinated multiple point operation, and generating an auxiliary cell candidate list according to the performance value, wherein a cell having a larger performance value has higher priority in the auxiliary cell candidate list.

10. The method according to claim 1, wherein the activation strategy comprises: using a selection algorithm to determine a cell, a performance value of which reaches a threshold, as an auxiliary cell by taking a performance parameter of a cell in the candidate list related to the coordinated multiple point operation as an index.

11. A system for interactively selecting an auxiliary cell, comprising: a UE and a master cell, wherein
   the UE is configured to: select the master cell and perform data interaction with the master cell to obtain a neighbour cell list; measure coordinated multiple point status information of a cell in the neighbour cell list, and perform evaluation according to a measurement result to generate a candidate list of coordinated multiple point auxiliary cells; send the candidate list to the master cell; and maintain an activation list until a coordinated multiple point operation service ends; and
   the master cell is configured to: perform an activation strategy on a cell in the candidate list to obtain an auxiliary cell for the coordinated multiple point operation of the UE, and send an auxiliary cell activation list to the UE.

12. The system according to claim 11, wherein the UE is further configured to: send a suggestion report to the master cell when finding, by real-time measurement and evaluation, that a cell in the candidate list reaches a condition of becoming an auxiliary cell in the activation list or that a cell in the activation list does not satisfy a condition of severing as an auxiliary cell any longer; and the master cell is further configured to: determine, through decision-making, whether to add or delete an auxiliary cell, and send a determination result to the UE.

13. The system according to claim 12, further comprising one or more neighbour cells, wherein the neighbour cell is configured to: send coordinated multiple point status information with the master cell and other neighbour cells to each other; and periodically measure its own coordinated multiple point status information and send it to the master cell; and the master cell is further configured to: after receiving the coordinated multiple point status information of the neighbour cell, update coordinated multiple point status information of the neighbour cell maintained by the master cell, and determine a neighbour cell supporting the coordinated multiple point operation; and periodically measure its own coordinated multiple point status information and send it to the neighbour cell supporting the coordinated multiple point operation, and update a neighbour cell list stored by the master cell after periodically receiving the coordinated multiple point status information measured by the neighbour cell.

14. The system according to claim 12, wherein the coordinated multiple point status information comprises: a coordinated multiple point operation attribute of a cell and a performance parameter of the cell related to a coordinated multiple point operation.

15. The system according to claim 11, further comprising one or more neighbour cells, wherein the neighbour cell is configured to: send coordinated multiple point status information with the master cell and other neighbour cells to each other; and periodically measure its own coordinated multiple point status information and send it to the master cell; and the master cell is further configured to: after receiving the coordinated multiple point status information of the neighbour cell, update coordinated multiple point status information of the neighbour cell maintained by the master cell, and determine a neighbour cell supporting the coordinated multiple point operation; and periodically measure its own coordinated multiple point status information and send it to the neighbour cell supporting the coordinated multiple point operation, and update a neighbour cell list stored by the master cell after periodically receiving the coordinated multiple point status information measured by the neighbour cell.

16. The system according to claim 11, wherein the coordinated multiple point status information comprises: a coordinated multiple point operation attribute of a cell and a performance parameter of the cell related to a coordinated multiple point operation.

* * * * *